United States Patent [19]

Ramey et al.

[11] 4,067,848

[45] Jan. 10, 1978

[54] ALKYL ALKANOATE DERIVATIVES OF SUBSTITUTED PIPERAZINE-DIONES AND POLYMER COMPOSITIONS STABILIZED THEREBY

[75] Inventors: Chester E. Ramey, Spring Valley; John J. Luzzi, Carmel, both of N.Y.

[73] Assignee: Ciba-Geigy Corporation, Ardsley, N.Y.

[21] Appl. No.: 701,767

[22] Filed: July 2, 1976

Related U.S. Application Data

[60] Division of Ser. No. 622,554, Oct. 15, 1975, Pat. No. 3,968,078, which is a division of Ser. No. 376,785, July 5, 1973, Pat. No. 3,920,659, which is a continuation-in-part of Ser. No. 239,795, March 30, 1972, abandoned.

[51] Int. Cl.$^2$ .......................... C08K 5/34; C08K 5/52; C08K 5/13

[52] U.S. Cl. .................. 260/45.8 NE; 260/45.7 PH; 260/45.8 NT; 260/45.85 B; 260/77.5 SS; 260/268 DK; 260/268 TR

[58] Field of Search ................................ 260/45.8 NB

[56] References Cited

U.S. PATENT DOCUMENTS 3,960,078   7/1976   Ramey et al. ................ 260/45.8 NB

*Primary Examiner*—H. S. Cockeram
*Attorney, Agent, or Firm*—Nestor W. Shust

[57] ABSTRACT

Alkyl alkanoic derivatives of substituted piperazinediones are stabilizers for synthetic polymeric materials normally subject to deterioration caused by ultraviolet light. The compounds may be formed by reacting a substituted piperazinedione with an acrylate or a crotonate, or reacting the alkali or alkaline earth salt of a substituted piperazine dione with a haloalkanoate. Polymeric compositions containing these stabilizers may also contain a hindered phenolic compound. A typical embodiment is n-octadecyl-$\beta$-(15(7,15-diazaspiro[5,3,5,3]hexadecane-14,16-dione)propionate.

13 Claims, No Drawings

ALKYL ALKANOATE DERIVATIVES OF SUBSTITUTED PIPERAZINE-DIONES AND POLYMER COMPOSITIONS STABILIZED THEREBY

RELATED APPLICATION

This application is a Division of co-pending application Ser. No. 622,554 filed Oct. 15, 1975, now U.S. Pat. No. 3,968,078 which was a Divisional of Ser. No. 376,785, filed July 5, 1973, now U.S. Pat. No. 3,920,659, which is a continuation-in-part of co-pending application Ser. No. 239,795, filed Mar. 30, 1972 now abandoned.

BACKGROUND OF THE INVENTION

This invention relates to the stabilization of organic material normally tending to deteriorate. In particular, the invention relates to the protection of synthetic polymers against the harmful degradative effects, such as discoloration and embrittlement caused by exposure to light, especially ultraviolet light.

It is known that actinic radiation, particularly in the near ultraviolet region, has a deleterious effect on both the appearance and properties of organic polymers. For example, normally colorless or light colored polyesters yellow on exposure to sunlight as do such cellulosics as cellulose acetate. Polystyrene discolors and cracks, with accompanying loss of its desirable physical properties when exposed to actinic light, while vinyl resins, such as polyvinyl chloride and polyvinyl acetate spot and degrade. The rate of air oxidation of polyolefins such as polyethylene and polypropylene is materially accelerated by ultraviolet light.

It has been proposed to stabilize polymeric materials against ultraviolet light deteriorization by the use of various types of ultraviolet absorbers. Thus, U.S. Pat. No. 3,004,896 discloses for this purpose 2(2-hydroxyphenyl)benzotriazole derivatives, while U.S. Pat. No. 3,189,630 discloses certain metal salts of hydroxybenzoic acids which are useful as actinic stabilizers in synthetic polymers.

DETAILED DISCLOSURE

The present invention is directed to a class of ultraviolet light stabilizers which consist of a compound of the formula

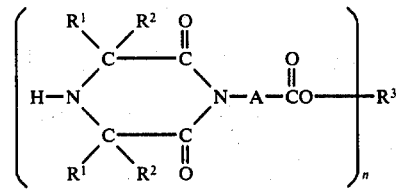

wherein
$R^1$ and $R^2$ are independently of each other methyl or ethyl or together with the carbon to which they are bound form a cyclopentyl or cyclohexyl ring, which is unsubstituted or substituted with a methyl group;
$n$ is an integer of from 1 to 2;
when $n$ is 1, $R^3$ is an alkyl group of from 1 to 20 carbon atoms;
when $n$ is 2, $R^3$ is an alkylene group of from 2 to 8 carbon atoms; and
A is a straight or branched chained (lower)alkylene group containing from 1 to 6 carbon atoms with the limitation that the terminals of said alkylene group bear only hydrogen or one (lower)alkyl group.

By the term alkyl as represented by $R^1$ and $R^2$ is intended methyl or ethyl, with methyl being the preferred substituent. Representative of the cycloalkyl groups, as represented by $R^1$ and $R^2$, are cyclohexyl, cyclopentyl, 2-methyl, 3-methyl and 4-methylcyclohexyl, and 2-methyl and 3-methylcyclopentyl. The preferred cycloalkyl groups are cyclohexyl and 2-methylcyclohexyl.

Illustrative examples of the (lower)alkylene groups as represented by A are methylene, ethylene, 1,2-propylene, n-propylene, 2,3-propylene, ethylidene, triethylene, 1,4-tetramethylene, 1-methyl-1,3-trimethylene, 2-methyl-1,3-trimethylene, pentamethylene, hexamethylene and the like.

This invention also relates to compositions of matter which are stabilized against ultraviolet light deterioration which comprises a synthetic organic polymer normally subject to ultraviolet deterioration containing from about 0.005 to 5% by weight of the polymer of the compounds of formula I and preferably from 0.01 to 2% by weight.

Alkyl alkanoate derivatives of the substituted piperazine diones as represented by formula I can be used in combination with other light stabilizers such as 2(2-hydroxyphenyl)benzotriazoles, 2-hydroxybenzophenones, nickel complexes and benzoates.

The stabilizers of this invention are suitable for the protection of many synthetic polymers from the deleterious effects of light. Homopolymers, copolymers, and mixtures thereof are embraced within the scope of substrates which may be stabilized with the stabilizers of this invention, along which may be mentioned, polystyrene and including homopolystyrene and copolymers with acrylonitrile and/or butadiene; vinyl resins formed from the polymerization of vinyl halides or from copolymerization of vinyl halides with unsaturated polymerizable compounds, for example, vinyl esters, $\alpha,\beta$-unsaturated acids, $\alpha,\beta$-unsaturated esters, and unsaturated hydrocarbons such as butadienes and styrene; poly-$\alpha$-olefins such as high and low density polyethylene, cross-linked polyethylene, polypropylene, poly(4-methyl-pentene-1) polybutene-1, and the like including copolymers of poly-$\alpha$-olefins such as ethylene-propylene copolymers, and the like; polybutadiene; polyisoprene; polyurethanes such as are prepared from polyols and organic polyisocyanate; polyamides such as hexamethylene-adipamide; polyesters such as polymethyleneterephthalates; polycarbonates such as those prepared from bisphenol-A and phosgene; polyacetals; polyethylene oxide; and polyacrylics such as polyacrylonitrile; polyphenyleneoxides such as those prepared from 2,6-dimethylphenol and the like. Particularly preferred polymers for the compositions of this invention are those normally solid polymers of alpha-olefins having up to 3 carbon atoms, e.g., ethylene-propylene and their copolymers.

The stabilized polymers of the present invention have utility in the normal uses for which plastics are employed and particularly useful for film and fiber. Compounds of this invention may be incorporated in the polymeric substance during the usual processing operations, for example, by hot milling, the composition then being extruded, pressed, blow molded or the like into films, fibers, filaments, hollow spheres and the like. Where the polymer is prepared from a liquid monomer as in the case of styrene, the stabilizer may be dispersed or dissolved in the monomer prior to polymerization or curing.

In addition to the actinic stabilizers described, the plastic compositions may contain other additives such as plasticizers, pigments, fillers, dyes, glass or other fibers, thermal antioxidants, and the like. For example in most applications, it is desirable to incorporate into the resin composition, sufficient thermal antioxidants to protect the plastic against thermal and oxidative degradation. The amount of antioxidant required will be comparable to that of the actinic stabilizer. Namely, from about 0.005 to 5% and preferably from 0.01 to 2% by weight. Representative of such antioxidants are phosphite esters, such as triphenylphosphite and dibutylphosphite and alkyl arylphosphites such as dibutylphenylphosphite, and the like.

The best results are obtained with the preferred class of thermal antioxidants, the hindered phenols. These compounds have been found to provide the best thermal stabilization with the least discoloration in the compositions of the invention. Typical of these phenolic antioxidants include the following:

1. Phenolic compounds having the general formula

wherein
Q is

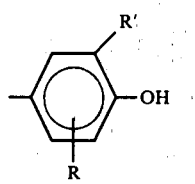

A is —CR(COOR")$_2$

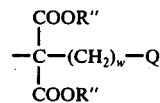

R is hydrogen or lower alkyl
R' is lower alkyl
R" is alkyl group having from 6-24 carbon atoms
w is an integer from 0 to 4.

Illustrative examples of the compounds shown above are
di-n-octadecyl α-(3,5-di-t-butyl-4-hydroxybenzyl)-malonate
di-n-octadecyl α-(3-t-butyl-4-hydroxy-5-methyl-benzyl)malonate which is disclosed in the Netherlands Pat. No. 6,711,199, Feb. 19, 1968
di-n-octadecyl-α,α'bis-(3-t-butyl-4-hydroxy-5-methylbenzyl)malonate which is disclosed in the Netherlands Pat. No. 6,803,498, Sept. 18, 1968.

2. Phenolic compounds having the general formula

Illustrative examples of the compounds shown above are
2,6-di-t-butyl-p-cresol
2-methyl-4,6-di-t-butylphenol and the like.

3. Phenolic compounds having the formula

2,2'-methylene-bis(6-t-butyl-4-methylphenol)
2,2'-methylene-bis(6-t-butyl-4-ethylphenol)
4,4'-butylidene-bis(2,6-di-t-butylphenol)
4,4'-(2-butylidene)-bis(2-t-butyl-5-methylphenol)
2,2'-methylene-bis[6-(1-methylcyclohexyl)-4-methylphenol]
and the like.

4. Phenolic compounds having the formula

Illustrative examples of such compounds are
2,5-di-t-butylhydroquinone
2,6-di-t-butylhydroquinone
2,5-di-t-butyl-4-hydroxyanisole 5. Phenolic compounds having the formula

Illustrative examples of such compounds are
4,4'-thiobis-(2-t-butyl-5-methylphenol)
4,4'-thiobis-(2-t-butyl-6-methylphenol)
2,2'-thiobis-(6-t-butyl-4-methyphenol)

6. Phenolic compounds having the formula

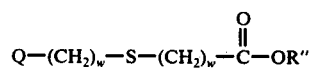

Illustrative examples of such compounds are
octadecyl-(3,5-dimethyl-4-hydroxybenzylthio)acetate
dodecyl-(3,5-di-t-butyl-4-hydroxybenzylthio)propionate 7. Phenolic compounds having the formula

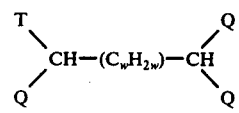

wherein
T is hydrogen
R or Q as defined above.
Illustrative examples of such compounds are
1,1,3-tris(3,5-dimethyl-4-hydroxyphenyl)-propane
1,1,3-tris(5-t-butyl-4-hydroxy-2-methylphenyl)-butane
1,1,5,5-tetrakis-3'-t-butyl-4'-hydroxy-6'-methylphenyl)-n-pentane 8. Phenolic compounds having the formula

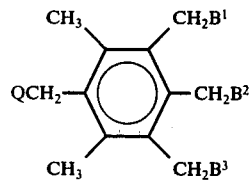

wherein B$^1$, B$^2$ and B$^3$ are hydrogen, methyl or Q, provided that when B$^1$ and B$^3$ are Q then B$^2$ is hydrogen or methyl and when B$^2$ is Q then B$^1$ and B$^3$ are hydrogen or methyl.

Illustrative examples of such compounds are 1,4-di(3,5-di-b-butyl-4-hydroxybenzyl)-2,3,5,6-tetramethylbenzene
1,3,5-tri(3,5-di-t-butyl-4-hydroxybenzyl)-2,4,6-trimethylbenzene 9. Phenolic compounds having the formula

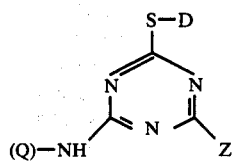

wherein
Z is NHQ, —S—D or —O—Q
D is alkyl group having from 6 - 12 carbon atoms or —(C$_w$H$_{2w}$)—S—R''

Illustrative examples of such compounds are
2,4-bis-(n-octylthio)-6-(3,5-di-t-butyl-4-hydroxyaniline)-1,3,5-triazine
6-(4-hydroxy-3-methyl-5-t-butylanilino)-2,4-bis(n-octylthio)-1,3,5-triazine
6-(4-hydroxy-3,5-dimethylanilino)-2,4-bis-(n-octylthio)-1,3,5-triazine
6-(4-hydroxy-3,5-di-t-butylanilino)-2,4-bis- (n-octylthioethylthio)-1,3,5-triazine
6-(4-hydroxy-3,5-di-t-butylanilino)-4-(4-hydroxy-3,5-di-t-butylphenoxy)-2-(n-octylthio)-1,3,5-triazine
2,4-bis(4-hydroxy-3,5-di-t-butylanilino)-6-(n-octylthio)-1,3,5-triazine.

The above phenolic triazine stabilizers are more fully described in U.S. Pat. No. 3,255,191.

10. Phenolic compounds having the formula

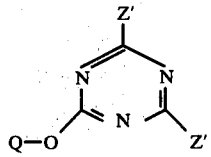

wherein Z' is —O—Q, —S—D or —S—(C$_w$H$_{2w}$)—SD
Illustrative examples of such compounds are
2,3-bis-(3,5-di-t-butyl-4-hydroxyphenoxy)-6-(n-octylthio)-1,3,5-triazine
2,4,6-tris-(4-hydroxy-3,5-di-t-butylphenoxy)-1,3,5-triazine.
6-(4-hydroxy-3,5-di-t-butylphenoxy)-2,4-bis-(n-octylthioethylthio)-1,3,5-triazine
6-(4-hydroxy-3-methylphenoxy)-2,4-bis-(n-octylthio)-1,3,5-triazine
6-(4-hydroxy-3-t-butylphenoxy)-2,4-bis-(n-octylthioethylthio)-1,3,5-triazine
6-(4-hydroxy-3-methyl-5-t-butylphenoxy)-2,4-bis-(n-octylthio)-1,3,5-triazine
2,4-bis-(4-hydroxy-3-methyl-5-t-butylphenoxy)-6-(n-octylthio)-1,3,5-triazine
2,4,6-tris-(4-hydroxy-3-methyl-5-t-butyphenoxy)-1,3,5-triazine
6-(4-hydroxy-3,5-di-t-butylphenoxy)-2,4-bis-(n-octylthiopropylthio)-1,3,5-triazine
6-(4-hydroxy-3,5-di-t-butylphenoxy)-2,4-bis-(n-dodecylthioethylthio)-1,3,5-triazine
2,4-bis-(4-hydroxy-3,5-di-t-butylphenoxy)-6-butylthio-1,3,5-triazine
2,4-bis-(4-hydroxy-3,5-di-t-butylphenoxy)-6-(n-octadecylthio)-1,3,5-triazine
2,4-bis-(4-hydroxy-3,5-di-t-butylphenoxy)-6-(n-dodecylthio)-1,3,5-triazine
2,4-bis-(4-hydroxy-3,5-di-t-butylphenoxy)-6-(n-octylthiopropylthio)-1,3,5-triazine
2,4-bis-(4-hydroxy-3,5-di-tbutylphenoxy)-6-(n-octylthioethylthio)-1,3,5-triazine
2,4-bis-(4-hydroxy-3,5-di-t-butylphenoxy)-6-(n-dodecylthioethylthio)-1,3,5-triazine.

The above phenolic triazine stabilizers are more fully described in U.S. Pat. No. 3,255,191.

11. Phenolic compounds having the formula

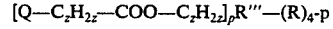

wherein p is an integer from 2 to 4 and
R''' is a tetravalent radical selected from aliphatic hydrocarbons having from 1 to 30 carbon atoms
aliphatic mono and dithioethers having from 1 to 30 carbon atoms
aliphatic mono and diethers having from 1 to 30 carbon atoms and
z is an integer from 0 to 6.

Illustrative examples of such compounds are

Sub-class I n-Octadecyl 3-(3,5-di-t-butyl-4-hydroxyphenyl)propionate
n-Octadecyl 2-(3,5-di-t-butyl-4-hydroxyphenyl)-acetate
n-Octadecyl 3,5-di-t-butyl-4-hydroxybenzoate
n-Hexyl 3,5-di-t-butyl-4-hydroxyphenylbenzoate
n-Dodecyl 3,5-di-t-butyl-4-hydroxyphenylbenzoate
Neo-dodecyl 3-(3,5-di-t-butyl-4-hydroxyphenyl)-propionate
Dodecyl β-(3,5-di-t-butyl-4-hydroxyphenyl)-propionate
Ethyl α-(4-hydroxy-3,5-di-t-butylphenyl)-isobutyrate
Octadecyl α-(4-hydroxy-3,5-di-t-butylphenyl)isobutyrate
Octadecyl α-(4-hydroxy-3,5-di-t-butylphenyl)propionate

Sub-class II 2-(n-octylthio)ethyl 3,5-di-t-butyl-4-hydroxybenzoate
2-(n-octylthio)ethyl 3,5-di-t-butyl-4-hydroxyphenylacetate
2-(n-octadecylthio)ethyl 3,5-di-t-butyl-4-hydroxyphenylacetate
2-(n-octadecylthio)ethyl 3,5-di-t-butyl-4-hydroxy benzoate
2-(2-hydroxyethylthio)ethyl 3,5-di-t-butyl-4-hydroxybenzoate
2,2'-Thiodiethanol bis(3,5-di-t-butyl-4-hydroxyphenyl)acetate
Diethyl glycol bis-[3,5-di-t-butyl-4-hydroxyphenyl)propionate]
2-(n-octadecylthio)ethyl 3-(3,5-di-t-butyl-4-hydroxyphenyl)propionate
2,2'-Thiodiethanol-bis-3-(3,5-di-t-butyl-4-hydroxyphenyl)propionate
Stearamido N,N-bis-[ethylene 3-(3,5-di-t-butyl-4-hydroxyphenyl)propionate]
n-Butylimino N,N-bis-[ethylene 3-(3,5-di-t-butyl-4-hydroxyphenyl)propionate]
2-(2-stearoyloxyethylthio)ethyl 3,5-di-t-butyl-4-hydroxybenzoate
2-82-hydroxyethylthio)ethyl 7-(3-methyl-5-t-butyl-4-hydroxyphenyl)heptanoate 2-(2-stearoyloxyethylthio)ethyl 7-(3-methyl-5-t-butyl-4-hydroxyphenyl)heptanoate Sub-class III 1,2-propylene glycol bis-[3-(3,5-di-t-butyl-4-hydroxyphenyl)propionate]
Ethylene glycol bis-[3-(3,5-di-t-butyl-4-hydroxyphenyl)propionate]
Neopentylglycol bis-[3-(3,5-di-t-butyl-4-hydroxyphenyl)propionate]
Ethylene glycol bis-(3,5-di-t-butyl-4-hydroxyphenylacetate)
Glycerine-1-n-octadecanoate-2,3-bis-(3,5-di-t-butyl-4-hydroxyphenylacetate
Pentaethylthritol-tetrakis-[3-(3,5-di-t-butyl-4-hydroxyphenyl)propionate]
1,1,1-trimethylol ethane-tris-3-(3,5-di-t-butyl-4-hydroxyphenyl)propionate
Sorbitol hexa-[3-(3,5-di-t-butyl-4-hydroxy-phenyl)-propionate]
1,2,3-butanetriol tris-[3-(3,5-di-t-butyl-4-hydroxyphenyl)propionate]
2-hydroxyethyl 7-(3-methyl-5-t-butyl-4-hydroxyphenyl)heptanoate
2-stearoyloxyethyl 7-(3-methyl-5-t-butyl-4-hydroxyphenyl)heptanoate
1,6-n-hexanediol-bis[(3′,5′-di-t-butyl-4-hydroxyphenyl)propionate]

The above phenolic ester stabilizers of sub-classes I, II and III are more fully described in U.S. Pat. No. 3,330,859, and U.S. 3,644,482, respectively.

12. Phenolic compounds having the formula

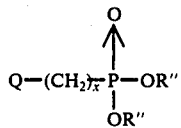

where x is an integer of 1 to 2.

Illustrative examples of such compounds are
Di-n-octadecyl 3,5-di-t-butyl-4-hydroxybenzylphosphonate
Di-n-octadecyl 3-t-butyl-4-hydroxy-5-methylbenzylphosphonate
Di-n-octadecyl 1-(3,5-di-t-butyl-4-hydroxyphenyl)-ethanephosphonate
Di-n-tetradecyl 3,5-di-t-butyl-4-hydroxybenzylphosphonate
Di-n-hexadecyl 3,5-di-t-butyl-4-hydroxybenzylphosphonate
Di-n-docosyl-3,5-di-t-butyl-4-hydroxybenzylphosphonate
Di-n-octadecyl-3,5-di-t-butyl-4-hydroxybenzylphosphonate The above di-(higher)alkyl phenolic phosphonates are more fully described in U.S. Pat. No. 3,281,505.

13. Phenolic compounds having the formula

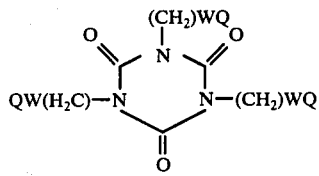

wherein W and Q are as defined above.

Illustrative examples of such compounds are:
tris-(3,5-di-t-butyl-4-hydroxybenzyl)isocyanurate
tris-(3-t-butyl-4-hydroxy-5-methylbenzyl)isocyanurate The above hydroxyphenylalkenyl isocyanuarates are more fully described in U.S. Pat. No. 3,531,483.

The above phenolic hydrocarbon stabilizers are known and many are commercially available.

While any of the above mentioned antioxidants can be useful in combination with the ultraviolet light stabilizers of this invention, the preferred antioxidants consist of the hindered phenols in groups 1, 8, 9, 10, 11, 12 and 13 as mentioned above. The most preferred hindered phenols are those of groups 1, 9, 11, 12 and 13.

The compounds of this invention may be prepared by reacting a substituted piperazine dione of the formula

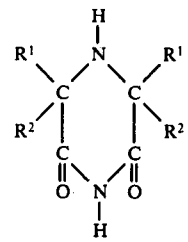

wherein $R^1$ and $R^2$ are defined above with a compound of the formula

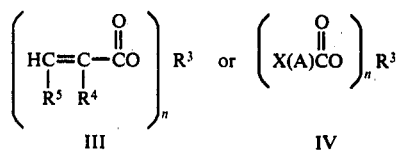

wherein
$R^3$, n and A are as defined previously each of $R^4$ and $R^5$ is hydrogen or methyl; and
X is chlorine or bromine.

The reaction with the compounds of formula II with either of the compounds of formula III or IV is carried out under a nitrogen atmosphere in the presence of a base such as potassium hydroxide or trimethylbenzyl ammonium methoxide.

Compound of formula II, wherein $R^1$ and $R^2$ form a mono cyclic ring with the carbon to which they are attached, may be prepared by the self condensation of a cycloalkyl amino cyanohydrin according to the procedure described by R. Sudo and S. Ichihera, Bull. Chem. Soc. Japan 36 34 (1963) and subsequent hydrolysis as described by E. F. J. Duynstee et al., Recucil de Chemie des Pays-Bas 87 945 (1968). The cycloalkylamino cyanhydrin is formed by the sequential addition of hydrogen cyanide and ammonia to a cycloalkanone as described by W. E. Noland, R. J. Sundberg and M. L. Michaelson, J. Org. Chem. 28 3576 (1963). Although the above references deal specifically with the cycloalkyl case, the procedures therein have been found to be operable in the alkyl case as well, for example, substitution of an alkanone such as acetone for the cycloalkanone such as cyclohexanone in the above procedure.

Illustrative examples of the alkyl group as represented by $R^3$ include both branched and straight chained hydrocarbons such as methyl, ethyl, propyl, isopropyl, butyl, pentyl, isopentyl, hexyl, octyl, dodecyl, tetradecyl, hexadecyl, octadecyl, eicosyl and the like. The preferred alkyl group contains from 6 to 18 carbon atoms. Examples of the alkylene group as represented by $R^3$ include both branched and straight chained hydrocarbons containing from 2 to 8 carbon atoms such as ethylene, 1,3-propylene, 1,2-propylene, butylene, isobutylene, pentylene, hexylene, octylene and the like.

Examples of the alkyl and alkylene haloalkanoates of formula IV include
  alkyl or alkylene α-chloroacetates
  alkyl or alkylene β-bromopropionate
  alkyl or alkylene α-chloropropionate
  alkyl or alkylene β-bromobutarate
  alkyl or alkylene γ-bromobutarate
  alkyl or alkylene α-methyl-β-bromobutyrate
  alkyl or alkylene β-chlorobutyrate
  alkyl or alkylene δ-bromovalerate
  alkyl or alkylene α-methyl-γ-bromobutyrate
  alkyl or alkylene β-methyl-γ-bromobutyrate
  alkyl or alkylene ω-bromohexanoate
  alkyl or alkylene ω-bromoheptanoate Examples of the alkyl and alkylene acrylates and crotonates of formula III include
  alkyl or alkylene acrylate
  alkyl or alkylene methacrylate
  alkyl or alkylene crotonate The following examples, presented for illustration and not limitation, will further serve to typify the nature of the present invention.

EXAMPLE 1

1-Aminocyclohexanecarbonitrile

In a 200 ml three-necked flask equipped with a stirrer, thermometer, condenser drying tube and gas inlet tube were placed 100 g. (0.8 moles) of cyclohexanone cyanohydrin and the reaction mixture was cooled with an ice bath to 15° C. Gaseous anhydrous ammonia was introduced to the reaction mixture through the gas inlet tube for 6 hours. The reaction was then stoppered and allowed to stand overnight.

The next day anhydrous ammonia was again passed through the reaction mixture for 5 hours at 25° C then dry $N_2$ was passed through the reaction mixture to entrain any excess $NH_3$. The product was then dissolved in 250 ml of benzene, the benzene solution washed two times with 250 ml of water, and the solution dried over anhydrous $Na_2SO_4$. Evaporation of the benzene yielded the product which was a slightly yellow oil.

In a similar manner, 1-aminoisobutyronitrile was prepared by substituting for cyclohexanone cyanohydrin an equivalent amount of acetone cyanohydrin.

Similarly, 1-amino-2-methyl-cyclohexanecarbonitrile is prepared by substituting for cyclohexanone cyanohydrin an equivalent amount of 2-methyl-cyclohexanone cyanohydrin.

EXAMPLE 2

Bis-(1-cyanocyclohexyl)amine

In a one-necked round bottomed flask equipped with a capillary nitrogen inlet and an air condenser was placed 48.2 g. (0.39 moles) of 1-aminocyclohexane carbonitrile. The reaction mixture was heated in an oil bath to a bath temperature of 75°-100° over 1 hour and placed under a vacuum of using a water aspirator. The reaction was continued for 24 hours, cooled to room temperature, the vacuum released, and the crystalline mass was triturated with ether and filtered by suction, yielding 19.1 g. of white crystals, m.p. 133°-138° C.

In a similar manner, bis(1-cyanoisopropylamine) was prepared by substituting for 1-aminocyclohexane carbonitrile an equivalent amount of 1-aminoisobutyronitrile.

Similarly, bis-(1-cyano-2-methylcyclohexyl)amine is prepared by substituting for 1-aminocyclohexanecarbonitrile an equivalent amount of 1-amino-2-methyl cyclohexanecarbonitrile.

EXAMPLE 3

7,15-diazadispiro[5,1,5,3]hexadecane-14,16-dione

To 406 g. of 96% $H_2SO_4$ contained in a 500 ml three-necked flask equipped with a stirrer, thermometer and powder funnel was added with stirring and cooling, 30.0 g. of powdered bis-(1-cyanocyclohexyl)amine over about a 2 hour period. The temperature of the reaction mixture was maintained at 0°-5° during the addition by using an ice bath. The reaction mixture was allowed to warm to room temperature and to stir overnight. The reaction mixture was then heated to 100° C for 1 hour, then cooled to approximately 15° C and poured onto 3000 g. of ice. The aqueous mixture was neutralized to pH 7 by the addition of approximately 800 ml of 10N NaOH. The resulting precipitate was collected by suction filtration, washed well with water, and dried in a vacuum oven, yielding a white powder, m.p. 155°-160°.

In a similar manner, 2,2,6,6-tetramethyl-3,5-diketopiperazine was prepared by substituting for bis(1-cyanohexyl)amine an equivalent amount of bis(1-cyanoisopropylamine).

Similarly, 1,9-dimethyl-7,15-diazadispiro[5,1,5,3] hexadecane-14,16-dione is prepared by substituting for bis-(1-cyanocyclohexyl)amine an equivalent amount of bis-(1-cyano-2-methylcyclohexyl)amine.

EXAMPLE 4

Methyl-α-(15-{7,15-diazadispiro[5,1,5,3] hexadecane-14,16-dione})acetate

A. To a solution of 10.0 g (0.04 moles) of 7,15-diazadispiro[5,1,5,3]hexadecane-14,16-dione in 150 ml of anhydrous methanol in a 500 ml flask was added 2.6 g of 86% KOH (0.04 moles) and the mixture was shaken until the solution was obtained. The reaction mixture was then evaporated to dryness under reduced pressure. The residue was transferred to a 300 ml three-necked flask equipped with a stirrer, thermometer, condenser with drying tube and nitrogen inlet with the aid of a small amount of dry DMF. To the potassium imide salt, under a nitrogen atmosphere, was added 150 ml of dry DMF. To the stirred solution, under a nitrogen atmosphere, was added dropwise, a solution of 6.12 (0.04 moles) of methyl bromoacetate in 50 ml of dry DMF. The reaction mixture was heated slowly to 50° and held at that temperature for 3 hours. The reaction mixture was then cooled and allowed to stand at room temperature overnight. The reaction mixture was taken up in 500 ml ether, the ether solution washed well with water, dried over anhydrous $Na_2SO_4$ and evaporated under reduced pressure yielding the desired product, m.p. 142°-145° C after recrystallization from methanol.

B. By following the above procedure (A), and substituting for the methyl bromoacetate an equivalent amount of:
  a. ethyl α-bromopropionate
  b. n-octyl chloroacetate c. n-octadecyl bromoacetate
d. ethyl α-bromo-valerate
e. ethyl ω-bromo-hexanoate
f. propyl α-methyl-γ-bromobutyrate there is respectively obtained the following compounds:
a. ethyl-α-(15-{7,15-diazadispiro[5,1,5,3]hexadecane-14,16-dione})propionate
b. n-octyl-α-(15-{7,15-diazadispiro[5,1,5,3]hexadecane-14,16-dione})acetate
c. n-octadecyl-α-(15-{7,15-diazadispiro[5,1,5,3]hexadecane-14,16-dione})acetate
d. ethyl-α-(15-{7,15-diazadispiro[5,1,5,3]hexadecane-14,16-dione})valerate
e. ethyl-ω-(15-{7,15-diazadispiro[5,1,5,3]hexadecane-14,16-dione})hexanoate
f. propyl-γ-(15-{7,15-diazadispiro[5,1,5,3]hexadecane-14,16-dione})-α-methylbutyrate C. By following the above procedure (A), and substituting for 7,15-diazadispiro[5,1,5,3]hexadecane-14,16-dione an equivalent amount of:
a. 2,2,6,6-tetramethyl-3,5-diketopiperazine
b. 1,9-dimethyl-7,15-diazadispiro[5,1,5,3]-hexadecane-14,16-dione there is respectively obtained the following compounds:
a. methyl-α-(4-{2,2,6,6-tetramethyl-3,5-diketopiperazino})acetate
b. methyl-α-(15-{1,9-dimethyl-7,15-diazadispiro[5,1,5,3]hexadecane-14,16-dione})acetate.

EXAMPLE 5

Methyl-β-(15{7,15-diazadispiro[5,1,5,3]hexadecane-14,16-dione})propionate

In a 100 ml three-necked flask equipped with stirrer, thermometer, condenser and drying tube, nitrogen inlet and two dropping funnels was placed 12.5 g (0.05 moles) of 7,15-diazadispiro[5,1,5,3]hexadecane-14,16-dione and 0.025 g of hydroquinone. To the starting material was added with stirring in a nitrogen atmosphere from one dropping funnel 1 ml of trimethyl benzyl ammonium hydroxide (40% in methanol). Methyl acrylate (25 ml) was added dropwise as the reaction mixture was heated to 40° C. When 8 ml of the methyl acrylate had been added, the remaining trimethyl benzylammonium methoxide solution (1.5 ml) was added dropwise simultaneously. When the addition was complete, the temperature of the reaction was raised to 85°–90° C for 0.5 hour. The reaction mixture was then cooled slightly and filtered. The filtrate was evaporated under reduced pressure and the residue was taken up in acetone. The product was precipitated from the acetone solution by the addition of water, separated by suction filtration, and recrystallized from methanol, giving white crystals m.p. 87°–89° C.

By following the above procedure, and substituting for 7,15-diazadispiro[5,1,5,3]hexadecane-14,16-dione an equivalent amount of:
a. 2,2,6,6-tetramethyl-3,5-diketopiperazine
b. 1,9-dimethyl-7,15-diazadispiro[5,1,5,3]hexadecane-14,16-dione there is respectively obtained the following compounds:
a. methyl-β-(4-{2,2,6,6-tetramethyl-3,5-diketopiperazino})propionate
b. methyl-β-(15-{1,9-dimethyl-7,15-diazadispiro[5,1,5,3]hexadecane-14,16-dione})propionate.

EXAMPLE 6

By essentially following the procedure of Example 5 and substituting for the reactants used, i.e., 7,15-diazadispiro[5,1,5,3]hexadecene-14,16-dione and methylacrylate, an equivalent amount of the following reactants:
a. 7,15-diazadispiro[5,1,5,3]hexadecane-14,16-dione + n-dodecyl acrylate
b. 7,15-diazadispiro[5,1,5,3]hexadecane-14,16-dione + 1,4-butylenediacrylate
c. 7,15-diazadispiro[5,1,5,3]hexadecane-14,16-dione + n-octadecyl acrylate
d. 2,2,6,6-tetramethyl-3,5-diketopiperazine + 1,8-octylene diacrylate
e. 7,15-diazadispiro[5,1,5,3]hexadecane-14,16-dione + methylmethacrylate there is respectively obtained the following compounds:
a. n-dodecyl-β-(15{7,15-diazadispiro[5,1,5,3]hexadecane-14,16-dione})propionate
b. n-tetramethylene bis(-β-{15-[7,15-diazadispiro[5,1,5,3]hexadecane-14,16-dione)}propionate), m.p. 106°–108° C.
c. n-octadecyl-β-(15{7,15-diazadispiro[5,1,5,3]hexadecane-14,16-dione}) propionate, m.p. 43°–45° C
d. n-octamethylene bis(-β-{4-[2,2,6,6-tetramethyl-3,5-diketopiperazino]}propionate)
e. methyl-β-(15[7,15-diazadispiro[5,1,5,3]hexadecane-14,16-dione])-α-methylpropionate, m.p. 102°–106° C

EXAMPLE 7

Artifical Light Exposure Test

Deterioration of most polymers caused by ultraviolet light is so slow at ambient temperatures, even in the absence of stabilizers, that testing of the effects of stabilizers generally must be conducted either at higher temperatures or in an accelerated artificial light exposure device in order to yield results in a convenient period of time. The tests conducted on polymers using an artificial light exposure device is described below:

a. Sample Preparation 5 mil Film — Unstabilized polypropylene powder (Hercules Profax 6501) is thoroughly blended with the indicated amounts of additives. The blended material is then milled on a two roll mill for 5 minutes at 182° C. The milled sheet is then compression molded at 220° C into 5 mil thick film under a pressure of 175 psi and water cooled in the press.

b. Testing Method

This test is conducted in a FS/BL unit, basically of the American Cyanamid design, which consists of 40 tubes of alternating fluorescent sunlamps and black lights (20 of each). The 5 mil sample film which are mounted on 3 × 2 inch IR card holders with ¼ × 1 inch windows and are placed on a rotating drum 2 inches from the bulbs in the FS/BL unit. The time in hours is noted for the development of 0.5 carbonyl absorbance units as determined on an Infrared Spectophotometer. The development of carbonyl functional groups in the polymer is proportional to the amount of degradation caused by the ultraviolet light exposure.

The test results reported below were obtained according to the procedures described above. The amounts of the additives are expressed in weight percent based on the weight of the polymer.

Table I

| Formulation* | Time in Hours to .5 Carbonyl Absorbance Units |
| --- | --- |
| .5% methyl-β-(15{7,15-diaza-dispiro[5,1,5,3]hexadecane-14,16-dione})propionate | 965 |
| .5% n-dodecyl-β-(15{7,15-diazadispiro[5,1,5,3]hexadecane-14,16-dione})propionate | 1190 |
| .5% n-tetramethylene bis(β-{15[7,15-diazadispiro[5,1,5,3]hexadecane-14,16-dione]}propionate | 810 |
| .5% n-octadecyl-β-(15{7,15-diazadispiro[5,1,5,3]hexadecane-14,16-dione})propionate | 1110 |
| .5% methyl-β-(15{7,15-diazadispiro[5,1,5,3]hexadecane-14,16-dione}) α-methyl propionate | 925 |
| .5% methyl-α-(15{7,15-diazadispiro[5,1,5,3]hexadecane-14,16-dione}) acetate | 900 |
| *Control | 225 |

*Each of the samples tested and the control contains 0.2% of (di-octadecyl (3,5-di-t-butyl-4-hydroxybenzyl)phosphonate which is an anti-oxidant which prevents oxidative degradation of polypropylene during processing.

Other hindered phenolic antioxidants may be used in place of di-octadecyl(3,5-di-t-butyl-4-hydroxybenzyl)-phosphonate in the above mentioned compositions for example, di-n-octacdecyl α-(3-t-butyl-4-hydroxy-4-methylbenzyl)malonate, 2,4-bis(n-octylthio)-6-(3,5-di-t-butyl-4-hydroxyaniline)-1,3,5-triazine, octadecyl 3-(3',5'-di-t-butyl-4'-hydroxyphenyl)propionate, pentaethylthritol-tetrakis[3-(3,5-di-t-butyl-4-hydroxyphenyl)]-propionate, tris-(3,5-di-t-butyl-4-hydroxybenzyl-)isocyanurate, respectively.

EXAMPLE 8 a. A composition comprising acrylonitrilebutadienestyrene terpolymer and 1% by weight of methyl-β-(15{7,15-diazadispiro[5,1,5,3]hexadecane-14,16-dione})propionate resists embrittlement due to exposure to ultraviolet light longer than one which does not contain the stabilizer.

b. A composition comprising polyurethane prepared from toluene diisocyanate and alkylene polyols and 1.0% by weight of n-dodecyl-β-(15{7,15-diazadispiro[5,1,5,3]hexadecane-14,16-dione})propionate is more stable to sunlight, fluorescent sunlamps, black lights and fluorescent lights than the unformulated polyurethane.

c. A composition comprising a polycarbonate prepared from bisphenol-A and phosgene and 1% by weight of n-tetramethylene bis(-β-{15[7,15-diazadispiro[5,1,5,3]hexadecane-14,16-dione]}propionate) resists discoloration due to exposure to ultraviolet light longer than one which does not contain the stabilizer.

d. A composition comprising a polyester (polyethyleneterephthalate) and 0.2% by weight of n-octadecyl-β-(15{7,15-diazadispiro[5,1,5,3]hexadecane-14,16-dione})propionate resists discoloration due to exposure to ultraviolet light longer than one which does not contain the stabilizer..

e. A composition comprising polymethylmethacrylate and 0.25% by weight of n-octamethylene bis(-β-{4[2,2,6,6-tetramethyl-3,5-diketopiperazino]}propionate) resists discoloration due to exposure to ultraviolet light longer than one which does not contain the stabilizer.

EXAMPLE 9 a. A stabilized linear polyethylene is prepared by incorporating therein 0.5% by weight of ethyl-ω-(15{7,15-diazadispiro[5,1,5,3]hexadecane-14,16-dione}·)hexanoate. The stabilized compositions resist embrittlement due to exposure to ultraviolet light longer than one which does not contain the stabilizer.

b. A stabilized polyamide (nylon 6,6) is prepared by incorporating therein 0.1% of methyl-β-(15{7,15-diazadispiro[5,1,5,3]hexadecane-14,16-dione})acetate. The light stability of the stabilized composition is superior to that of an unstabilized polyamide.

c. A stabilized polyphenylene oxide polymer (prepared by polymerizing 2,6-dimethylphenol is prepared by incorporating therein 0.5% by weight of methyl-β-(4{2,2,6,6-tetramethyl-3,5-diketopiperazino})propionate. The stabilized compositions resist embrittlement due to exposure to ultraviolet light longer than one which does not contain the stabilizer.

d. A stabilized crystalline polystyrene is prepared by incorporating therein 0.1% by weight of methyl-β-(15{7,15-diazadispiro[5,1,5,3]hexadecane-14,16-dione})-α-methylpropionate. The stabilized compositions resist embrittlement due to exposure to ultraviolet light longer than one which does not contain the stabilizer.

EXAMPLE 10

High impact polystyrene resin containing elastomer (i.e., butadiene-styrene) is stablized against loss of elongation properties due to exposure to ultraviolet light by incoporation of 0.3% by weight of n-octadecyl-α-(15{7,15-diazadispiro[5,1,5,3] hexadecane-14,16-dione}·)acetate.

The unstabilized resin is dissolved in chloroform and the stabilizer then added, after which the mixture is cast on a glass plate and the solvent evaporated to yield a uniform film which, upon drying, is removed and cut up, and then pressed for 7 minutes at a temperature of 163° C and a pressure of 2,000 pounds per square inch into a sheet of uniform thickness (25 mil). The sheets are then cut into strips approximately 4 × 0.5 inches. A portion of these strips is then measured for percent of elongation in the Instron Tensil Testing Apparatus (Instron Engineering Corporation, Quincy, Massachusetts). The remaining portion of the strips are placed in an FS/BL chamber according to Example 6 (b) except that the samples are mounted and white cardboard stock and the time of 50% reduction in elongation is measured. The stabilized polystyrene resin retains its elongation property longer than the unstabilized resin.

Similar results are obtained when an equivalent amount of the following stabilizers are used in place of the above mentioned stabilizer.

a. 0.1% by weight of methyl-β(15{7,15-diazadispiro[5,1,5,3]hexadecane-14,16-dione})propionate b. 0.2% by weight of methyl-β-(4-{2,2,6,6-tetramethyl-3,5-diketopiperazino})propionate c. 0.1% by weight of methyl-β-(15{1,9-dimethyl-7,15-diazadispiro[5,1,5,3]hexadecane-14,16-dione})propionate d. 0.1% by weight of methyl-α-(15-{1,9-dimethyl-7,15-diazadispiro[5,1,5,3]hexadecane-14,16-dione})acetate e. 0.5% by weight of n-dodecyl-β-(15{7,15-diazadispiro[5,1,5,3]hexadecane-14,16-dione})propionate f. 1% by weight of n-tetramethylene bis-(β-{15[7,15-diazadispiro[5,1,5,3]hexadecane-14,16-dione]}propionate)

g. 0.5% by weight of n-octadecyl-β-(15{7,15-diazadispiro[5,1,5,3]hexadecane-14,16-dione})propionate h. 0.5% by weight of n-octamethylene bis-(β-{4[2,2,6,6-tetramethyl-3,5-diketopiperazino]}propionate)

i. 0.5% by weight of ethyl-α-(4-{2,2,6,6-tetramethyl-3,5-diketopiperazino})acetate j. 0.1% by weight of ethyl-α-(15-{7,15-diazadispiro[5,1,5,3]hexadecane-14,16-dione})propionate k. 0.1% by weight of ethyl-α-(15-{7,15-diazadispiro[5,1,5,3]hexadecane-14,16-dione})valerate l. 0.5% by weight of ethyl-ω-(15-{7,15-diazadispiro[5,1,5,3]hexadecane-14,16-dione})hexanoate m. 0.5% by weight of propyl-α-(15-{7,15-diazadispiro[5,1,5,3]hexadecane-14,16-dione}-α-methyl butyrate.

Antioxidants may also be incorporated into each of the above mentioned compositions, for example, di-n-octadeyl-α,α'-bis(3-butyl-4-hydroxy-5-methylbenzyl) malonate 2,4-bis(4-hydroxy-3,5-di-t-butylphenoxy)-6-(n-octylthioethylthio)-1,3,5-triazine, 2,4-bis(3,5-di-t-butyl-hydroxyphenoxy)-6-(n-octylthio)-1,3,5-triazine di-n-octadecyl 3(3', 5'-di-t-butyl-4-hydroxyphenyl)propionate, respectively.

What is claimed is:

1. A composition of matter stabilized against ultraviolet deterioration which comprises a synthetic organic polymer normally subject to ultraviolet deterioration and from 0.01 to 2% by weight of the polymer of a stabilizing compound of the formula

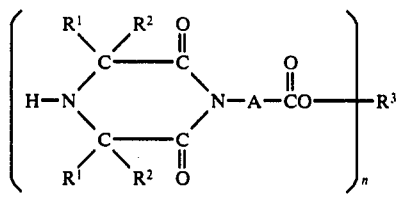

wherein
$R^1$ and $R^2$ are independently of each other methyl or ethyl or together with the carbon to which they are bound form a cyclopentyl or cyclohexyl ring, which is unsubstituted or substituted with a methyl group;
$n$ is an integer of from 1 to 2;
when $n$ is 1, $R^3$ is alkyl of from 1 to 20 carbon atoms;
when $n$ is 2, $R^3$ is alkylene of from 2 to 8 carbon atoms; and
A is a straight or branched chained (lower) alkylene group having from 1 to 6 carbon atoms with the limitation that the terminals of said alkylene group bear only hydrogen or one (lower)alkyl group.

2. A composition of claim 1 which contains additionally 0.01 to 2% by weight of the polymer of a hindered phenolic antioxidant.

3. A composition of claim 1 wherein the stabilizer is of the formula

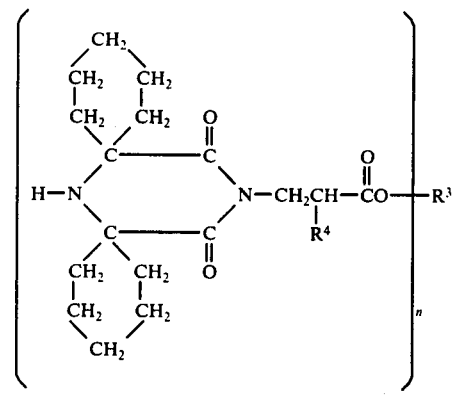

wherein
$n$ is 1 or 2;
when $n$ is 1, $R^3$ is alkyl of from 1 to 20 carbon atoms;
when $n$ is 2, $R^3$ is alkylene of from 2 to 8 carbon atoms; and
$R^4$ is hydrogen or methyl.

4. A composition of claim 3 wherein the polymer is a polyolefin from an alpha-olefin of up to 3 carbons.

5. A composition of claim 3 wherein $n$ is 1 and $R^3$ is an alkyl of from 6 to 18 carbon atoms.

6. A composition of claim 3 wherein $n$ is 2 and $R^3$ is an alkylene of from 2 to 8 carbon atoms.

7. A composition of claim 1 wherein the polymer is a polyolefin from an alpha-olefin of up to 3 carbons.

8. A composition of claim 7 wherein $R^1$ and $R^2$ are independently of each other methyl or ethyl.

9. A composition of claim 7 wherein $R^1$ and $R^2$ are each methyl.

10. A composition of claim 7 where the stabilizer is n-dodecyl-β-(15{7,15-diazadispiro[5,1,5,3]hexadecane-14,16-dione})propionate.

11. A composition of claim 7 where the stabilizer is n-tetramethylene bis-(β-{15(7,15-diazadispiro[5,1,5,3]hexadecane-14,16-dione}propionate.

12. A composition of claim 7 where the stabilizer is n-octadecyl-β-(15{7,15-diazadispiro[5,1,5,3]hexadecane-14,16-dione})propionate.

13. A composition of claim 2 wherein the phenolic antioxidant is selected from the group consisting of di-n-octadecyl α-(3-t-butyl-4-hydroxy-4-methylbenzyl)-malonate, 2,4-bis(n-octylthio)-6-(3,5-di-t-butyl-4-hydroxyaniline)-1,3,5-triazine, octadecyl 3-(3', 5'-di-t-butyl-4'-hydroxyphenyl)propionate, pentaethylthritol-tetrakis[3-(3,5-di-t-butyl-4-hydroxyphenyl)]proionate, tris-(3,5-di-t-butyl-4-hydroxybenzyl)isocyanurate, respectively.

* * * * *